United States Patent [19]

Galloway

[11] Patent Number: 5,405,591
[45] Date of Patent: Apr. 11, 1995

[54] METHOD FOR REMOVING SULPHIDE(S) FROM SOUR GAS

[75] Inventor: A. J. Galloway, Mississauga, Canada
[73] Assignee: Galtec Canada, Ltd., Canada
[21] Appl. No.: 188,966
[22] Filed: Jan. 27, 1994
[51] Int. Cl.$^6$ .................. B01D 53/14; B01D 53/34
[52] U.S. Cl. .................................. 423/228; 423/226
[58] Field of Search ........................... 423/226, 228

[56] References Cited

U.S. PATENT DOCUMENTS

| | | | |
|---|---|---|---|
| 1,991,765 | 2/1935 | Mark | 568/75 |
| 4,310,435 | 1/1982 | Frenier | 252/180 |
| 4,680,127 | 7/1987 | Edmondson | 423/226 |
| 4,978,512 | 12/1990 | Dillon | 423/226 |
| 5,085,842 | 2/1992 | Porz et al. | 423/226 |
| 5,128,049 | 7/1992 | Gatlin | 423/226 |

FOREIGN PATENT DOCUMENTS

93/01126  1/1993  WIPO .......................... 423/228

OTHER PUBLICATIONS

Dillon, E. "Triazines Sweeten Gas Easier", Hydrocarbon Processing, Dec. 1991, pp. 65–66.
Schaak, J. P., Chan, F. "Formaldehyde-methanol. . . agents Head Scavengers List," Oil and Gas Journal, Jan. 23, 1989, pp. 51–56.

Primary Examiner—Michael Lewis
Assistant Examiner—Peter T. DiMauro
Attorney, Agent, or Firm—Kirschstein et al.

[57] ABSTRACT

A process for removing sulphide(s) from sour gas comprising contacting sour gas with a treatment agent comprised of make-up triazine. The treatment agent extracts sulphide(s) from the sour gas to sweeten the gas and form a residual solution comprised of a sulphinated component and an alkanolamine component. The sulphinated component of the solution is substantially separated from the alkanolamine component of the solution by decanting. Dithiazine and trithiane is crystallized out of the spent sulphinated component and removed from the process. Aldehyde is added to the remaining alkanolamine component to form a sulphide reactive agent. The sulphide reactive agent is combined with make-up triazine to produce the treatment agent for contacting with the sour gas. The present invention also includes a system for completing the above steps comprising feed means for supplying the treatment agent, $H_2S$ reactor for contacting the sour gas with the treatment agent, a decanting vessel for separating the sulphinated component from the alkanolamine component, a crystallization unit for crystallization of the dithiazine and trithiane, an aldehyde reactor for adding the aldehyde to the alkanolamine component to form the sulphide reactive agent and a feed line to add the sulphide reactive agent to the treatment agent.

9 Claims, 2 Drawing Sheets

METHOD FOR REMOVING SULPHIDE(S) FROM SOUR GAS

FIELD OF THE INVENTION

This invention relates to a process and a system for removing sulphide(s) from natural gas.

BACKGROUND OF THE INVENTION

Natural gas containing sulphide(s) in the form of hydrogen sulphide, thiol (including mercaptans) and other sulphide compounds is known as sour gas. The combustion of sour gas produces oxides of sulphur ($SO_3$ and $SO_2$). These oxides of sulphur are serious air pollutants and eventually produce, when combined with water, what is known as acid rain. Additionally, these sulphide compounds are poisonous and lethal to humans and animals and are corrosive to metals and other materials used for the handling and transporting of natural gas. Consequently, there is a requirement that sulphides present in the sour gas be removed to produce "sweet gas". Sweet gas is generally known in the industry as natural gas containing less than 4 to 16 ppm $H_2S$ and a maximum total of 30 to 80 ppm sulphide.

Currently, the natural gas industry uses batch and continuous processes for the removal of $H_2S$ and other sulphide compounds. However, these processes often release dangerous sulphides to the environment. Consequently, there is a need for a process which reduces atmospheric pollution and solid sulphur discharge while producing a stable sulphide compound which can be safely stored and transported.

SUMMARY OF THE INVENTION

The subject invention provides a process for removing sulphide(s) from sour gas comprising the steps of contacting sour gas with a treatment agent, the treatment agent comprising a reaction product of an alkanolamine and an aldehyde, commonly called a triazine, such that the treatment agent extracts sulphide(s) from the sour gas to sweeten the gas by reacting with the sulphide(s) to form a solution comprised of a sulphinated component and an alkanolamine component, substantially separating the sulphinated component from the alkanolamine component, adding aldehyde to the alkanolamine component to form a sulphide reactive agent, and repeating the step of contacting, utilizing the sulphide reactive agent in the treatment agent. In this way, a cyclic, regenerative process is provided.

The subject invention also provides for a system for removing sulphide(s) from sour gas, comprising feed means for supplying a treatment agent comprising triazine, contacting means for contacting the sour gas with a treatment agent comprised of the triazine such that the treatment agent extracts sulphide(s) from the sour gas to sweeten said gas by reacting with the sulphide(s) to form a solution comprised of a sulphinated component and an alkanolamine component, feed means for feeding the solution to a separating means, separating means for substantially separating the sulphinated component from the alkanolamine component, means to add aldehyde to the alkanolamine component to form a sulphide reactive agent, the sulphide reactive agent being combined with the treatment agent; and means to add the sulphide reactive agent to the treatment agent.

BRIEF DESCRIPTION OF THE DRAWINGS

The following is a description, by way of example only, of the preferred embodiment of the system and process for removing sulphide(s) from sour gas, such as forms the subject invention, reference being had to the accompanying drawings, in which.

DETAILED DESCRIPTION OF THE DRAWINGS

Figure 1:
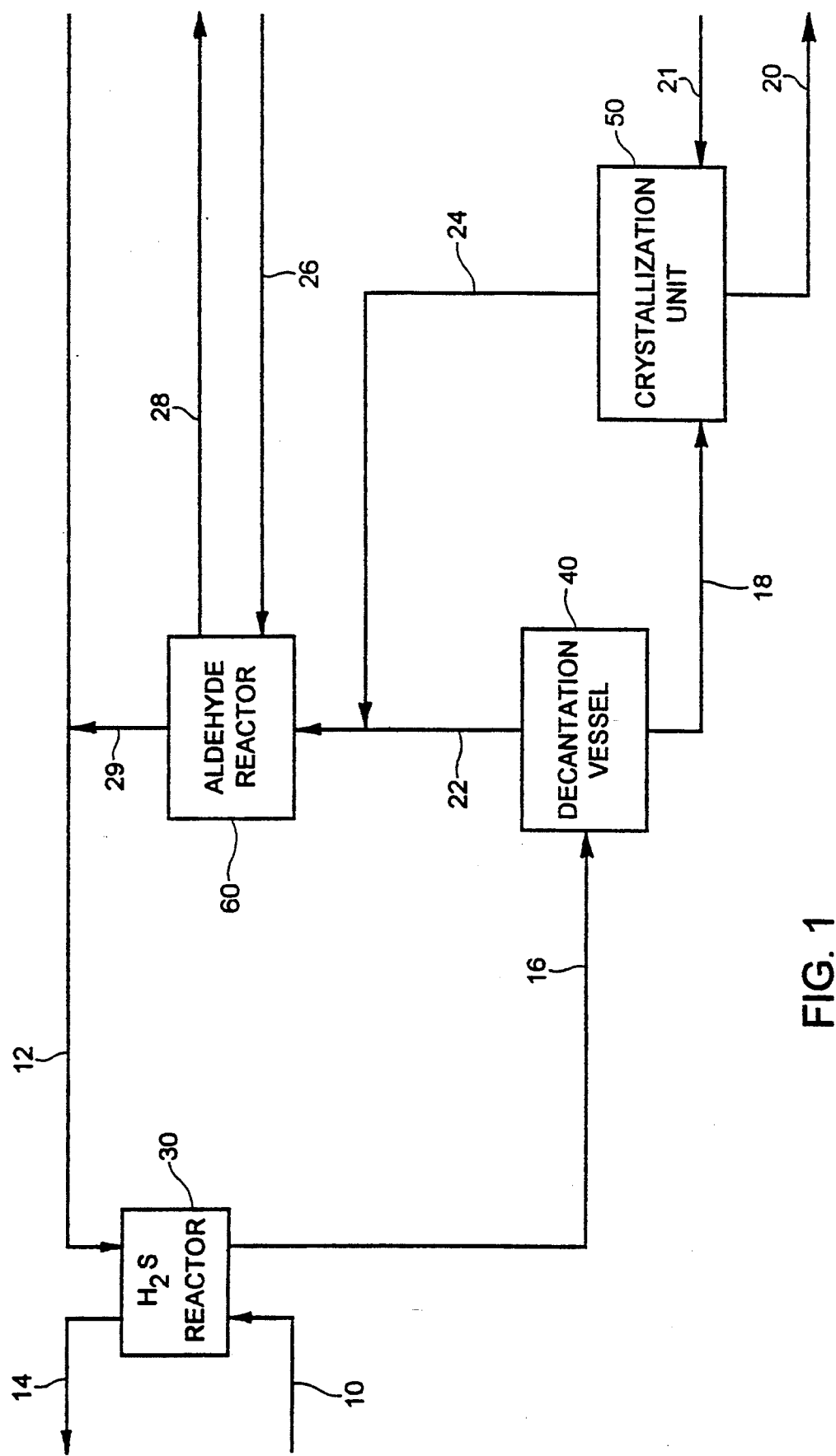
FIG. 1 is a flow sheet diagram of the process.

Referring now to FIG. 1, affluent streams 10 and 12 containing sour gas and a treatment agent, respectively, are fed into $H_2S$ reactor 30. The treatment agent is comprised of make-up triazine, which is a reaction product of an aldehyde and an alkanolamine, in a solvent carrier made up of water and methanol. The treatment agent also comprises a sulphide reactive agent which is recycled from the process, as will be described in greater detail hereinafter. In the $H_2S$ reactor 30, the treatment agent is commingled with the sour gas and reacts with the sulphide(s) present in the sour gas thereby removing the sulphide(s) from the natural gas to sweeten the gas. The reaction also removes an equal molar quantity of carbon dioxide, if carbon dioxide is present in the sour gas. The resulting sweet gas is removed via effluent stream 14. The reaction produces a solution containing a sulphinated component and an alkanolamine component. The sulphinated component comprises sulphinated triazines in the form of trithiane and dithiazine. The alkanolamine component comprises alkanolamines, carbon dioxide (if carbon dioxide was present in the sour gas) which is associated with the alkanolamines, and the solvent carrier ($H_2O$ and methanol).

The solution is removed from reactor 30 by effluent stream 16 and is fed into decantation vessel 40. The sulphinated component is more dense than the alkanolamine component. Consequently, in decantation vessel 40, the alkanolamine component is substantially separated from the sulphinated component as the sulphinated component displaces the alkanolamine component by settling to the bottom of decantation vessel 40. Stream 18 transports substantially all of the sulphinated component to crystallization unit 50 wherein the trithiane and dithiazine are crystallized into solid form for easy removal via outlet line 20. Any of the alkanolamine component which finds it way to crystallization unit 50 is removed from crystallization unit 50 via stream 24 and fed into stream 22 for further use in the process. Stream 21 feeds water and methanol into crystallization unit 50 to assist with the crystallization step and to replace the methanol and water which is lost in the process.

Stream 22 originates in the decantation vessel 40 and transports the alkanolamine component to aldehyde reactor 60. Affluent stream 26 containing aldehyde, carried by a solvent ($H_2O$ and methanol), is fed into aldehyde reactor 60. The aldehyde reacts with the alkanolamine in the alkanolamine component to form a sulphide reactive agent and liberates any carbon dioxide which had been associated with the alkanolamine. The liberated carbon dioxide gas is removed from the aldehyde reactor 60 via effluent stream 28. The sulphide reactive agent is then fed into affluent stream 12 via stream 29 wherein the sulphide reactive agent mixes with make-up triazine in stream 12, together forming the treatment agent which is fed continuously into H$_2$S reactor 30.

The alkanolamine component may be recirculated in the process many times. A volume of make-up triazine is used in the subject process to supplement the small loss of sulphide reactive agent in crystallization unit 50.

Figure 2:
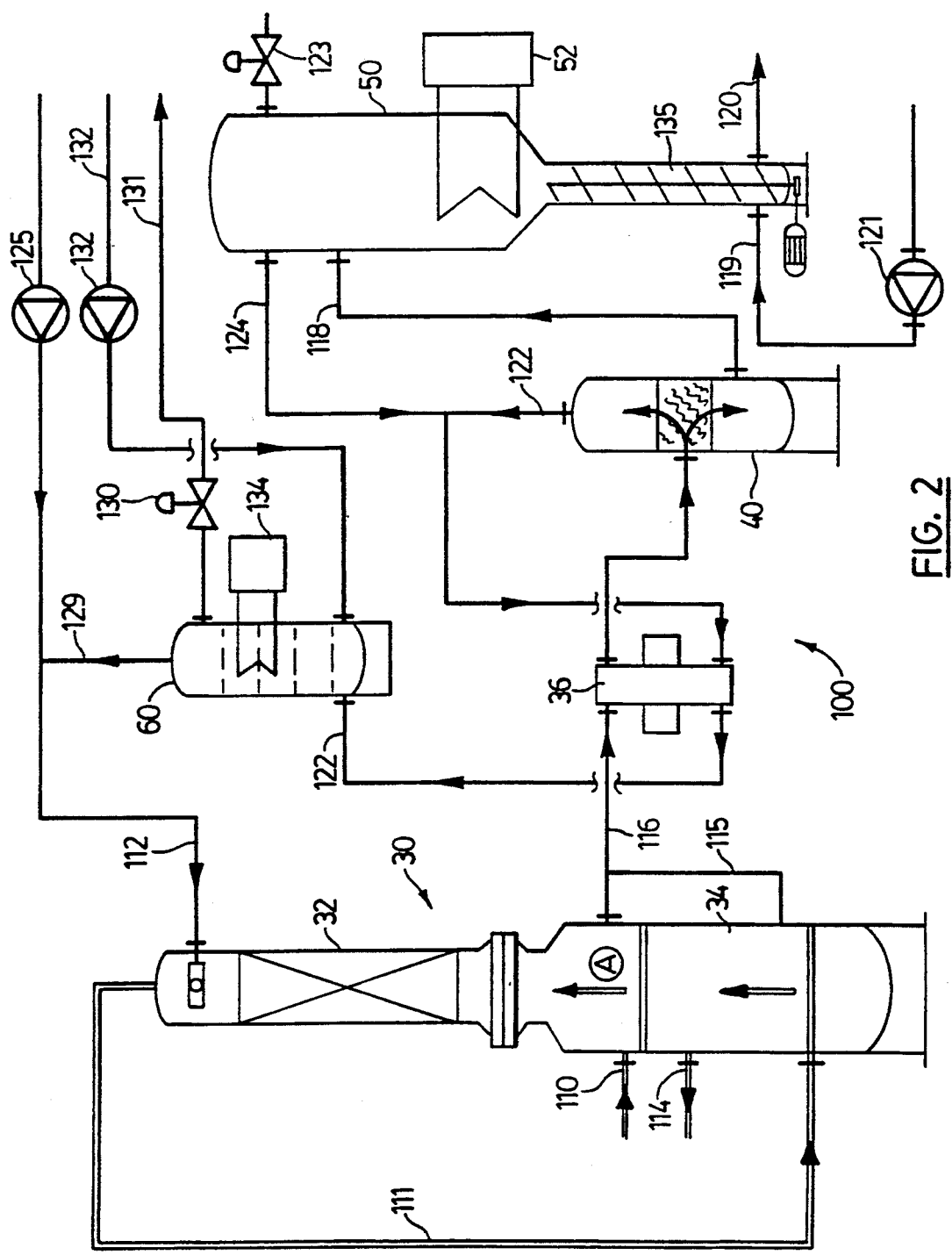
FIG. 2 is a schematic representation of the system implementing the process.

Referring now to FIG. 2, system 100 for implementing the process of FIG. 1 comprises H$_2$S reactor 30 having thin film contactor 32 and bubbler-separator 34. H$_2$S reactor 30 has affluent feedlines 110 and 112, recirculation line 111 and effluent lines 114, 115 and 116. Affluent line 112 incorporates pump 125. Feedline 116 connects H$_2$S reactor 30 to decantation vessel 40 through a recirculation pump 36.

Decantation vessel 40 is connected to crystallization unit 50 via feedline 118. Crystallization unit 50 is also connected to feedline 119 having pump 121, outlet lines 120 and 124, and release valve 123. The cooling coils of refrigeration unit 52 and the conveyor of motorized crystal conveyor 135 are within crystallization unit 50.

Decantation vessel 40 has an outlet line 122 to which line 124 from crystallization unit 50 joins. Outlet line 122 is connected to aldehyde reactor 60 through recirculation pump 36. Aldehyde reactor 60 is also connected to feedline 132 having pump 127 as well as to effluent lines 129 and 131. Cooling coils of cooler 134 are positioned within aldehyde reactor 60. Aldehyde reactor line 129 joins affluent line 112 which is connected to H$_2$S reactor 30. Line 131 incorporates valve 130.

In operation, sour gas is fed into H$_2$S reactor 30 via feedline 110 at zone A. The sour gas then flows up the H$_2$S reactor 30 into the section of the reactor comprising thin film contactor 32. The treatment agent is fed via feedline 112 to the top of thin film contactor 32. As the solvent carried treatment agent flows downward through the thin film contactor of the H$_2$S reactor 30, it wets out the surface of the thin film contactor 32. As will be understood by those skilled in the art, thin film contactor 32 allows for intimate contact between the sour gas and the treatment agent. When the treatment agent contacts the sour gas, it reacts with the sulphide(s) and carbon dioxide, if present in the sour gas. As a result, an equal molar amount of sulphide(s) and carbon dioxide (if carbon dioxide is present in the sour gas) are removed from the gas and the resulting sweet gas flows out of H$_2$S reactor 30 via recirculation line 111.

As previously noted, the reaction produces a solution containing a sulphinated component and an alkanolamine component. The spent sulphinated component comprises sulphinated triazines in the form of trithiane and dithiazine and the alkanolamine component comprises alkanolamines, carbon dioxide associated with the alkanolamines (if carbon dioxide was present in the sour gas), and a solvent carrier of H$_2$O and methanol. This solution migrates from the thin film contactor 32 to zone A. At zone A the solution meets sour gas introduced to the reactor 30 via affluent feedline 110 and the sour gas is saturated with the methanol and water solvent. Because of this, sour gas entering the thin film contactor will not take up any of this solvent from the treatment agent in the thin film contactor. This avoids the possibility of insufficient wetting of the thin film contactor by the treatment agent.

The solution exits zone A of H$_2$S reactor 30 via feedline 116, as a homogenous solution.

Recirculation line 111 transports the sweet gas from the thin film contactor into bubbler-separator 34 of H$_2$S reactor 30. As will be understood by those skilled in the art, bubbler-separator 34 allows any free liquid entrained in the gas, such as any remaining treatment agent, to separate from the gas stream and be retained in the bubbler-separator while the gas bubbles up through liquid in the bubbler-separator. Treatment agent in the bubbler-separator reacts with any non-reacted sulphide(s) present in the sweet gas. The sweet gas is then removed from bubbler-separator 34 via effluent line 114. The solution of reaction products present in the bubbler-separator exits H$_2$S reactor 30 via feedline 115 and joins the stream of solution in feedline 116.

The solution in feedline 116 comprising the sulphinated component and the alkanolamine component, is then transported by recirculation pump 36 to decantation vessel 40 for separation. The sulphinated component is removed from decantation vessel 40 via feedline 118 and transported to the crystallization unit 50 where crystallization of the dithiazine and trithiane molecules is accomplished though the use of refrigeration unit 52. Release valve 123 provides for the release of any built up natural gas within crystallization unit 50. A solution of methanol and water is fed by pump 121 into crystallization unit 50 via feedline 119 to compensate for the loss of solvent to the gas in zone A of reactor 30. The added solvent also facilitates the removal of dithiazine and trithiane crystals from crystallization unit 50 as does the motorized crystal conveyor 135. The dithiazine and trithiane crystals (along with some of the methanol and water solution) are removed from the crystallization unit 50 via outlet 120.

Some of the alkanolamine component passes from the decantation vessel into the crystallization unit with the dithiazine and trithiane. A small portion of the alkanolamines in this alkanolamine component will exit the system via feedline 120. However, the added methanol and water solvent displaces alkanolamine component which finds its way to the exit of the crystallization unit 50, so that most of this alkanolamine component is retained in the system. The alkanolamine component remains in the crystallization unit 50, along with the residual solution of methanol and H$_2$O, is removed via feedline 124. Feedline 124 joins up with the alkanolamine component removed from decantation vessel 50 via feedline 122. The combined flow is pumped by recirculation pump 36 to the aldehyde reactor 60. Pump 127 transports fresh aldehyde via feedline 132 to the aldehyde reactor unit 60. In the aldehyde reactor 60, the alkanolamine component reacts with the aldehyde to form sulphide reactive agent which is carried by the methanol and water solvent. Carbon dioxide gas is liberated from the solution and valve 130 is utilized to release the carbon dioxide gas from aldehyde reactor 60 via effluent line 131.

The solvent carried sulphide reactive agent exits the aldehyde reactor 60 and is fed into pipeline 112 via feedline 129 wherein the make-up triazine and the sulphur reactive agent combine to form the treatment agent which is then fed into thin film contactor 32 of H$_2$S reactor 30.

The make-up triazine can be produced from any of the following alkanolamines: mono, di, and tri methly amine; mono, di and tri ethyl amine; mono di, and tri n-propyl amine; iso proply amine; n, iso, sec, and tert butyl amine and ethylenediamine.

The make-up triazine can be produced from any of the following aldehydes: formaldehyde (methanal);

acetaldehyde (ethanal); propinaldehyde (propanal); and n-butyalaldehyde (butanal). In this regard, the composition of the make-up triazine may limit the number of times the alkanolamine component can be recycled as a sulphide reactive agent.

For cost reasons, it is preferable that the makeup triazine be formed from monoethylamine and aldehyde. However, other alkanolamines and aldehydes can be used and may even be preferable as the relative costs of the chemicals fluctuate. The aldehyde used in aldehyde reactor 60 can be formaldehyde, acetaldehyde, propinaldehyde, and/or butyaldehyde. Preference is given to formaldehyde for cost reasons.

It is preferable that the treatment agent be treated with a viscosity reducing agent and a surface tension reducing agent prior to entry of the treatment agent in thin film contactor 32 to allow for maximum surface wetting and contacting of the treatment agent and the sour gas.

It will be appreciated by those skilled in the art that solvents other than methanol and water may be used in the process.

It will be appreciated by those skilled in the art that the process of the present invention allows for the continuous removal of sulphide(s) from sour gas, while allowing for the recovery of alkanolamines, which when combined with an aldehyde, can be reused to produce a regenerated triazine to be recycled for further treatment of sour gas. This process reduces the demand for make-up triazine, which is a relatively expensive chemical and substantially reduces the cost of sour gas treatment for sulphides.

While the process and system of the present invention has been described and illustrated with respect to the preferred embodiment, it will be appreciated that numerous variations of this embodiment may be made without departing from the scope of the invention.

I claim:

1. A process for removing sulphide from sour gas comprising the steps of:

contacting sour gas with a treatment agent comprising triazine such that said treatment agent extracts sulphide from said sour gas to sweeten said gas by reacting with sulphide to form a solution comprised of a spent sulphinated component and an alkanolamine component;

separating at least a portion of said spent sulphinated component from said alkanolamine component;

reacting said alkanolamine component with aldehyde by adding aldehyde to said alkanolamine component to form a sulphide reactive agent; and repeating said step of contacting, wherein said sulphide reactive agent is mixed with said treatment agent.

2. The process of claim 1 wherein said separating step comprises decanting.

3. The process of claim 1 wherein the step of adding aldehyde comprises adding formalin.

4. The process of claim 1 wherein the triazine is produced from monoethylamine and formalin.

5. The process of claim 1 wherein said treatment agent and said gas are contacted in a thin film contactor.

6. The process of claim 2 wherein the sulphinated component comprises dithiazine and trithiane and the dithiazine and trithiane are crystallized and removed.

7. The process of claim 5 wherein the treatment agent is treated with a viscosity reducing agent prior to the contacting of said treatment agent with said gas.

8. The process of claim 7 wherein the treatment agent is treated with a surface tension reducing agent prior to contacting of said treatment agent with said gas.

9. A process for removing sulphide from sour gas comprising the steps of:

contacting sour gas with a treatment agent comprising triazine in a thin film contactor such that said treatment agent extracts sulphide from said sour gas to sweeten said gas by reacting with sulphide to form a solution comprised of a spent sulphinated component and an alkanolamine component;

separating at least a portion of said spent sulphinated component from said alkanolamine component by decanting;

reacting said alkanolamine component with formalin by adding formalin to said alkanolamine component to form a sulphide reactive agent;

removing dithiazine and trithiane from the sulphinated component through crystallization means; and repeating said step of contacting, wherein said sulphide reactive agent is mixed with said treatment agent.

* * * * *